United States Patent
Barrus

(10) Patent No.: US 8,892,990 B2
(45) Date of Patent: Nov. 18, 2014

(54) AUTOMATIC CREATION OF A TABLE AND QUERY TOOLS

(75) Inventor: John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 87 days.

(21) Appl. No.: 13/414,713

(22) Filed: Mar. 7, 2012

(65) Prior Publication Data

US 2013/0238968 A1   Sep. 12, 2013

(51) Int. Cl.
*G06F 17/27*   (2006.01)
*G06F 17/28*   (2006.01)

(52) U.S. Cl.
USPC .......................... 715/227; 715/221; 715/212

(58) Field of Classification Search
CPC ..................................... G06F 12/243
USPC ....................................... 715/227
See application file for complete search history.

(56) References Cited

U.S. PATENT DOCUMENTS

| | | | |
|---|---|---|---|
| 5,598,519 A * | 1/1997 | Narayanan | 715/219 |
| 5,615,367 A * | 3/1997 | Bennett et al. | 1/1 |
| 6,968,500 B2 * | 11/2005 | Mikhailov et al. | 715/221 |
| 7,961,943 B1 * | 6/2011 | Zeevi | 382/173 |
| 8,407,579 B2 * | 3/2013 | Raja et al. | 715/212 |
| 2002/0067854 A1 * | 6/2002 | Reintjes et al. | 382/199 |
| 2005/0022112 A1 * | 1/2005 | Kato | 715/505 |
| 2005/0231746 A1 * | 10/2005 | Parry et al. | 358/1.13 |
| 2005/0255439 A1 * | 11/2005 | Cody | 434/353 |
| 2006/0088214 A1 * | 4/2006 | Handley et al. | 382/176 |
| 2008/0065685 A1 * | 3/2008 | Frank | 707/102 |
| 2009/0089653 A1 * | 4/2009 | Campbell et al. | 715/209 |
| 2009/0094538 A1 * | 4/2009 | Ringler | 715/760 |
| 2010/0082536 A1 * | 4/2010 | Cosic | 707/610 |
| 2010/0150397 A1 * | 6/2010 | Handley et al. | 382/100 |
| 2013/0061124 A1 * | 3/2013 | Patton et al. | 715/224 |
| 2013/0166534 A1 * | 6/2013 | Yoon et al. | 707/714 |

* cited by examiner

*Primary Examiner* — James J Debrow
(74) *Attorney, Agent, or Firm* — Patent Law Works LLP

(57) ABSTRACT

An Image Based Document Management (IBDM) server includes a table generator, a query engine and a user interface engine. The table generator generates a table that includes a label image and at least one field image in a column. The label image represents a column header for the at least one field image. A query engine receives requests to modify the table and in response generates queries to query the table. A user interface engine provides the table for display and modifies the table in response to user input.

20 Claims, 15 Drawing Sheets

Table View

| | Last Name | (First Name) | DOB | SSN# | ☐ Male | ☐ Female | ⋮ Signature | ☐ Dependents | ☐ Date | ☐ Location |
|---|---|---|---|---|---|---|---|---|---|---|
| ☐ | Oscar | Mike | 7/12/1986 | ********** | ☒ | ☐ | *sig* | ☑ | 7/12/2011 | Utah |
| ☐ | Dagan | Jazz | 12/10/1971 | ********** | ☒ | ☐ | *sig* | ☑ | 6/07/2011 | Nevada |
| ☐ | Claveli | B.Roy | 15/05/1984 | ********** | ☒ | ☐ | *sig* | ☑ | 2/05/2010 | Idaho |
| ☐ | Kalatu | Elisha | 8/09/1975 | ********** | ☐ | ☒ | ⋮ | ⋮ | 1/11/2011 | Arizona |
| | ⋮ | | ⋮ | ⋮ | ⋮ | ⋮ | ⋮ | ⋮ | ⋮ | ⋮ |
| ☐ | Brown | Gene | 16/11/1983 | ********** | ☒ | ☐ | *sig* | ☑ | 8/10/2009 | Vermont |
| ☐ | Greene | Brooke | 11/12/1988 | ********** | ☐ | ■ | *sig* | ☑ | 3/06/2012 | Boston |
| ☐ | Wild | Tom | 12/04/1985 | ********** | ☒ | ☐ | *sig* | ☒ | 1/02/2010 | Utah |

Figure 3

Browser Window http://www.docmanage.com/

Document Management

Table View

| Last Name | First Name | DOB | SSN# | Mal | Signature | Dependents | Date | Location |
|---|---|---|---|---|---|---|---|---|
| Oscar | Mike | 7/12/1986 | ********* | ■ | | | | Utah |
| Dagon | Jazz | 12/10/1971 | ********* | ☒ edit strokes | Jazz | 3 | 6/07/2011 | Nevada |
| Vasek | LeRoy | 15/05/1984 | ********* | ☒ no strokes | LeRoy | 2 | 2/05/2010 | Idaho |
| Kalda | Elisha | 8/09/1975 | ********* | ☒ | Elisha | 2 | 1/11/2011 | Arizona |
| ... | ... | ... | ... | ... | ... | ... | ... | ... |
| Brown | Gene | 10/11/1983 | ********* | ☒ | Gene | 2 | 8/10/2009 | Vermont |
| Greene | Brooke | 11/12/1988 | ********* | ■ | Brooke | 2 | 3/06/2011 | Boston |
| Wild | Tom | 12/04/1985 | ********* | ☒ | Tom | ☒ | 7/02/2010 | Utah |

Filter

Document Management

| | Last Name | First N... | | | DOB | SSN# | Male | Female | | Signature | Dependents | | Date | Location |
|---|---|---|---|---|---|---|---|---|---|---|---|---|---|---|
| | | | convert | to symbolic | | | | | | | | | | |
| | | | sort | | | | | | | | | | | |
| | | | edit | | | | | | | | | | | |
| ☐ | Oscar | Mike | | | 7/12/1986 | ********* | ☒ | ☐ | | *sig* | ☐ | | 7/12/2011 | Utah |
| ☐ | Dagon | Jaz | | | 12/10/1971 | ********* | ☒ | ☐ | | *sig* | 3 | | 6/07/2011 | Nevada |
| ☐ | Vasuki | LeRoy | | | 15/05/1984 | ********* | ☒ | ☐ | | *sig* | 2 | | 2/05/2010 | Idaho |
| ☐ | Khalda | Elisha | | | 8/09/1975 | ********* | ☐ | ☒ | | *sig* | 2 | | 1/11/2011 | Arizona |
| | ... | ... | | | ... | ... | ... | ... | | ... | ... | | ... | ... |
| ☐ | Brown | Gene | | | 16/11/1983 | ********* | ☒ | ☐ | | *sig* | 2 | | 8/10/2009 | Vermont |
| ☐ | Greene | Brooke | | | 11/12/1988 | ********* | ☐ | ■ | | *sig* | 2 | | 3/06/2011 | Boston |
| ☐ | Wild | Tom | | | 12/04/1945 | ********* | ☒ | ☐ | | *sig* | ☒ | | 1/02/2010 | Utah |

Filter

AUTOMATIC CREATION OF A TABLE AND QUERY TOOLS

BACKGROUND OF THE INVENTION

1. Field of the Invention

The specification relates to generating a table from form images. In particular, the specification relates to automatically generating the table, modifying the table in response to queries and providing the table for display.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon and the Nook from Barnes & Noble. As memory size becomes smaller, people are increasingly foregoing laptops for tablets, such as the iPad from Apple Computer Inc., the Kindle Fire from Amazon and the Galaxy Tab from Samsung. Smaller portable computing devices such as smartphones are also useful because of their portability. Smartphones include the iPhone from Apple Computer Inc., the Droid from Motorola and the Blackberry from Research in Motion, just to name a few.

Portable computing devices can be used to input information into forms. Users will input information using a stylus and the form will be converted entirely into symbolic information including the stroke information using optical character recognition (OCR) or optical mark recognition (OMR). If a user wants to aggregate the symbolic information from the plurality of forms for subsequent querying and processing, the user has to rely upon the symbolic conversion being effectively carried out for the plurality of forms. However, the symbolic conversion is error prone, particularly for handwritten stroke information and often requires expensive human intervention to correct recognition errors while taking up computing resources that could be used in other ways.

SUMMARY OF THE INVENTION

The present invention overcomes the deficiencies of the prior art with a system and method for generating a table based on a plurality of form images. The plurality of form images include at least one label image, at least one field image and metadata associated with the images including a field identifier and a form identifier.

An Image Based Document Management (IBDM) server includes data storage for storing the plurality of form images including metadata associated with the plurality of form images. The Image Based Document Management (IBDM) server includes a table generator for generating the table by retrieving label images, field images and associated metadata. In one embodiment, the table generator determines a label image as a column header in the table, determines at least one field image as an entry under the column header based on matching a field identifier associated with the field image to the column header in the table and sorts an order of the field images under the column header based on a form identifier associated with the field image.

A user interface engine generates graphical data for displaying a user interface that includes the table and includes an option for the user to interact with the table and send requests to modify the table. In one embodiment, the table comprises at least one row of the table representing a form image from the plurality of form images and with at least one column of the table representing field images associated with the at least one column from the plurality of form images.

In one embodiment, the query engine receives a request to modify the table. Responsive to receiving the query, the query engine generates a query, queries the data storage using the query and sends instructions to the table generator to modify the table accordingly for display.

In one embodiment the invention includes receiving a request for generating a table from a user device, retrieving a plurality of form images, the form images including a label image and at least one field image associated with the field label, generating the table based on the plurality of form images and providing the table for display to the user device.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an example table of a plurality of form images.

FIG. 5 is a graphic representation of an example table that includes an option for filtering the table by the stroke information in a column.

FIG. 7 is a graphic representation of an example user interface that includes a pop-up of an original, un-filled version of the form for editing the form itself and the column header.

FIG. 8 is a graphic representation of an example table that includes an option for converting the stroke information in a column to symbolic representations.

FIG. 12 is a graphic representation of an example table where the rows were filtered with multiple sets of queries.

DETAILED DESCRIPTION OF THE PREFERRED EMBODIMENTS

Figure 1:
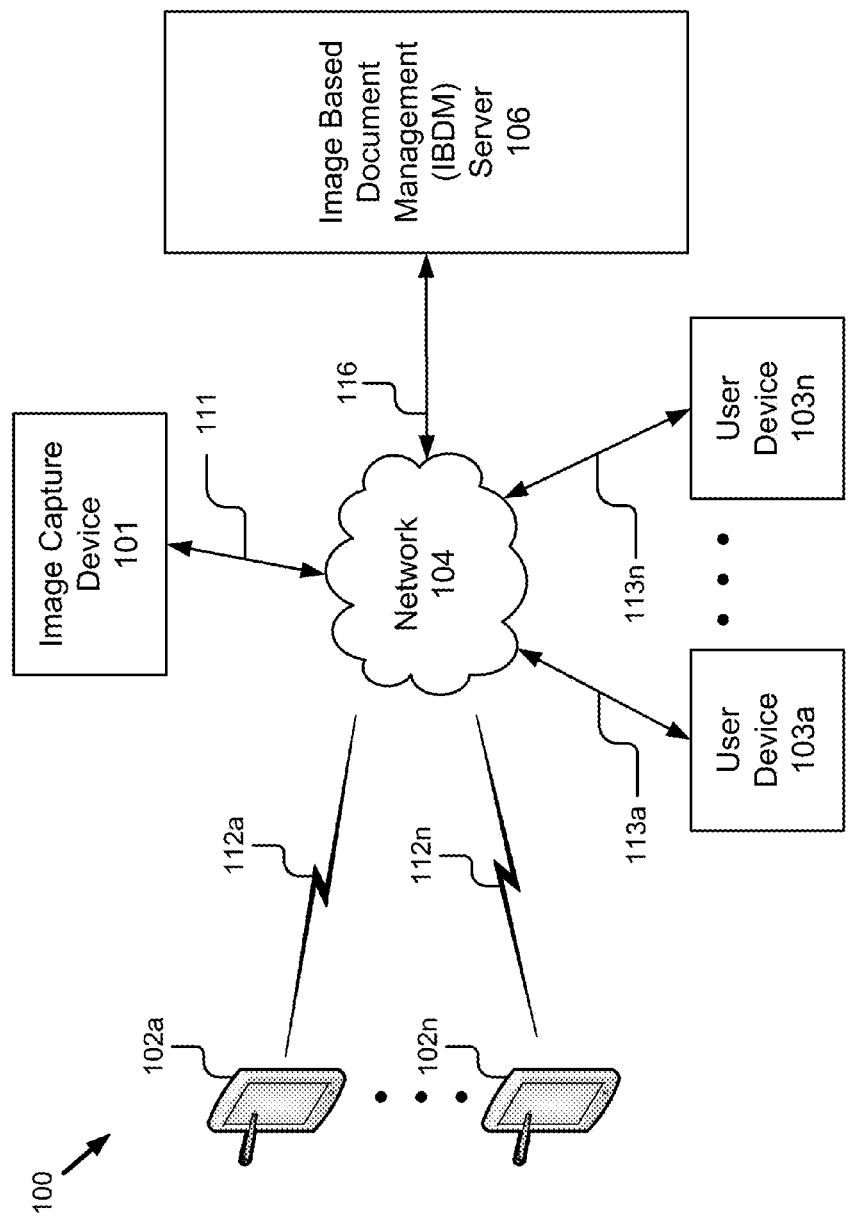
FIG. 1 is a high-level block diagram illustrating one embodiment of a system for generating a table of a plurality of form images.

A system and method for generating a table of a plurality of form images and executing queries on the table are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for generating a table of form images according to one embodiment of the invention. The system 100 includes an image capture device 101, portable computing devices 102a-102n, user devices 103a-103n and an Image Based Document Management (IBDM) server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of user devices 103a-103n, the plurality of portable computing devices 102a-102n and the IBDM server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated form images to the IBDM server 106. A form is any document that includes fields (i.e., blank spaces) for insertion of required or requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image and capture any strokes written on the form image using the stylus or a fingertip of the user. The strokes are typically displayed immediately on top of the image, just as if written by pen on paper. The computing pad usually captures the strokes as a sequence of points or segments along with location, timing and pressure information. The computing pad sends the form images including the captured strokes in any image format known to persons of ordinary skill in the art, for example, JPEG, JPEG2000, JPM, PNG, PDF, TIFF or simple PBM (portable bit map) file format, etc. In one embodiment, the computing pad attaches the information associated with the strokes, for example, the location and timing information with the form images as metadata. The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database. In one embodiment, the captured strokes are saved in a stroke format known to any person of ordinary skill in the art, including Scalable Vector Graphics (SVG) or InkML.

The image capture device 101 is coupled to the network 104 via signal line 111. Although only one image capture device 101 is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the IBDM server 106. In one embodiment, the image capture device 101 also sends an unmarked printed form image (i.e., an image of the printed form without any strokes) as metadata along with the captured image to the IBDM server 106. The image capture device 101 is, for example, a scanner, a digital camera, a standard cellular camera phone, a webcam, a video recorder, etc.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the IBDM server 106. For example, the user device 103 sends a request to view a table and/or to modify the table to the IBDM server 106. The user device 103 is accessed by users that have permission to access information from the IBDM server 106, such as a creator of the form sent to portable computing devices 102 or an administrator of the IBDM server 106.

The IBDM server 106 is coupled to the network 104 via signal line 116. In one embodiment, the IBDM server 106 receives form images including strokes from the portable computing devices 102a-102n and the image capture device 101, automatically identifies fields and labels in each of the form images and stores the cropped images of the fields and labels and associated metadata in the data storage 250. Although only one IBDM server 106 is illustrated, persons with ordinary skill in the art will recognize that any number of IBDM servers 106 can be coupled to the network 104. The IBDM server 106 is described in further detail below with reference to FIG. 2.

Image Based Document Management (IBDM) Server 106

Figure 2:
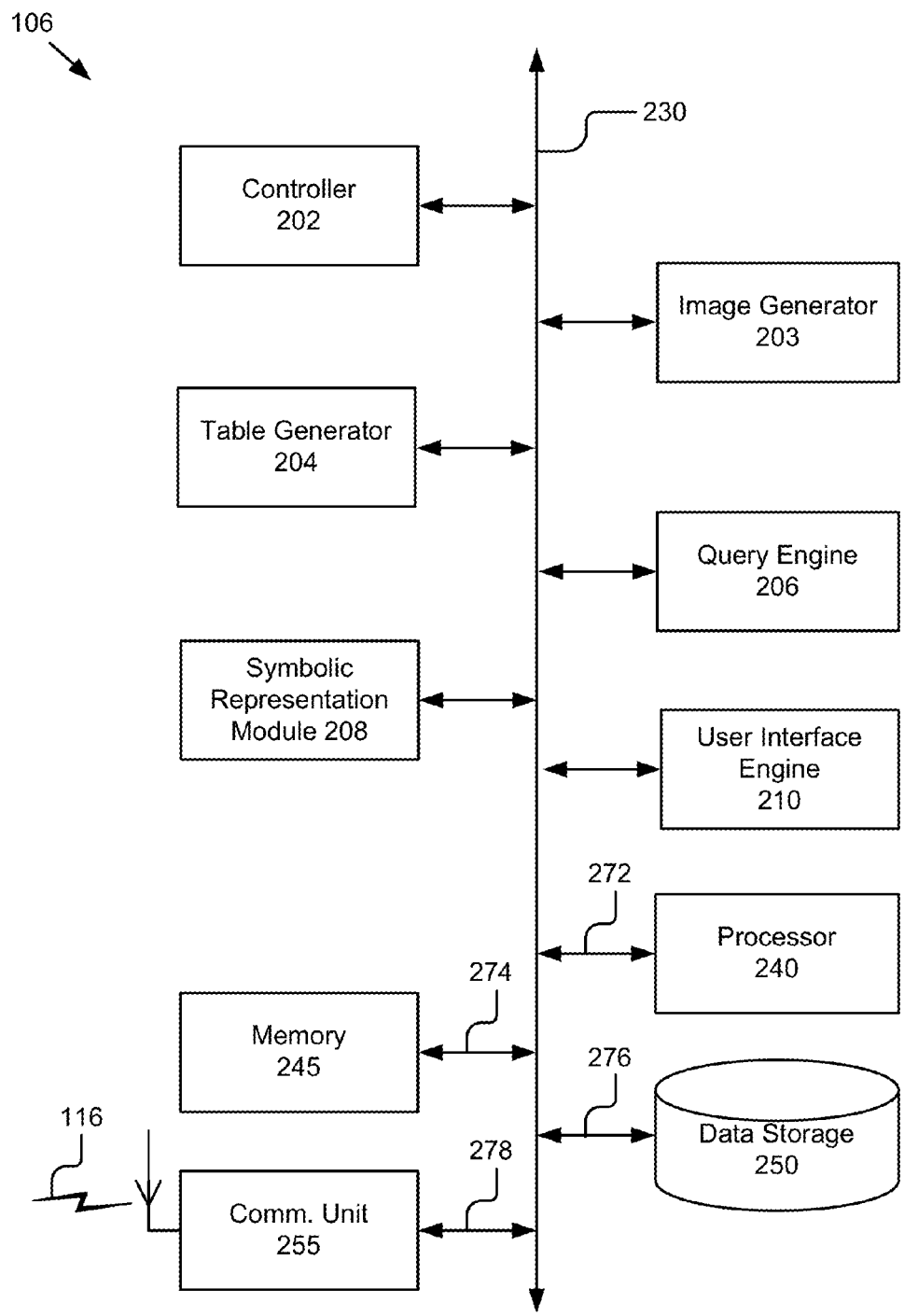
FIG. 2 is a block diagram illustrating one embodiment of an Image Based Document Management (IBDM) server in more detail.

Referring now to FIG. 2, the Image Based Document Management Server (IBDM) server 106 is shown in more detail. FIG. 2 is a block diagram of the IBDM server 106 that includes a controller 202, an image generator 203, a table generator 204, a query engine 206, a symbolic representation module 208, a user interface engine 210, a processor 240, a memory 245, a communication unit 255 and data storage 250.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the table generator 204, for example a request for querying a table. The communication unit 255 also receives information, such as form images, from the portable computing device 102. The communication unit 255 transmits the table to the user device 103, for example, the modified table in response to a query. The communication unit 255 is coupled to the bus 230 via signal line 278. In one embodiment, the communication unit 255 includes a port for direct physical connection to the user device 103, the portable computing device 102 or to another communication channel. For example, the communication unit 255 includes an RJ14 port or similar port for wired communication with the user device 103. In another embodiment, the communication unit 255 includes a wireless transceiver for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of form images received from the portable computing devices 102a-102n. The data storage 250 is coupled to the bus 230 for communication with the other components via signal line 276. The data storage 250 receives information from the image generator 203 that includes cropped images of labels (hereinafter referred to as "label images"), cropped images of strokes (hereinafter referred to as "field images") and metadata associated with the label images and field images including stroke metadata for recreating strokes as field images, a form identifier, a field identifier, a location of the cropped images on the form image and the relationship between field images and label images. The form identifier identifies a form image based at least on a timestamp, for example, associated with the form image (time and/or date of fill out) and the field identifier identifies a field and at least a location of the field on the form image. The metadata also includes stroke information including a date and time that each stroke was input and the location of each stroke. Lastly, the metadata includes symbolic representation information associated with the cropped images that are subjected to OCR, OMR, etc. The metadata is used in the generation of a table, as will be described in more detail below.

The controller 202 is software and routines for receiving data via the communication unit 255, routing the data to the appropriate engine or module and transmitting responses from modules or engines to the communication unit 255 for transmitting to the user device 103 and other components of the system 100. In one embodiment, the controller 202 is a set of instructions executable by the processor 240 to provide the functionality described below for managing data transfer between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255, the user interface engine 210 and other components of the IBDM server 106.

The image generator 203 is software and routines for generating images of fields and labels. In one embodiment, the image generator 203 is a set of instructions executable by the processor 240 to provide the functionality described below for generating field images and label images from each form image. In another embodiment, the image generator 203 is stored in the memory 245 and is accessible and executable by the processor 240. In either embodiment, the image generator 203 is adapted for cooperation and communication with the controller 202, the table generator 204, the data storage 250 and other components of the IBDM server 106.

The image generator 203 receives form images from the portable computing devices 102 via the controller 202. The image generator 203 generates field images by generating an overlay of all form images, identifying a group of strokes in each form image, identifying a size and a position of a bounding box that encompasses the group of strokes and generating a field image from each of the form images. In one embodiment, the image generator 203 crops the field image from the form image based on the size and the position of the bounding box. In another embodiment, the image generator 203 saves the stroke metadata from all the strokes on each form that intersected the field bounding box and stores the metadata in the data storage 250.

The image generator 203 generates label images by receiving a field image and the form image associated with the field image, analyzing an area around the field image in the form image to determine a group of related pixels, identifying the group of related pixels as the label for the field image and cropping a label image from an unmarked form image. The process is repeated for all the form images received from the portable computing devices 102. These examples assume that there is only one field and one label in the form image. Persons of ordinary skill in the art will recognize that the process applies to any number of fields and labels in the form image. The image generator 203 transmits the field images and the label images, along with any metadata, to the table generator 204. In one embodiment, the image generator 203 stores the field images and the label images, along with any metadata, in data storage 250.

The table generator 204 is software and routines for generating a table associated with a plurality of form images. In one embodiment, the table generator 204 is a set of instructions executable by the processor 240 to provide the functionality described below for generating the table. In another embodiment, the table generator 204 is stored in the memory 245 and is accessible and executable by the processor 240. In either embodiment, the table generator 204 is adapted for cooperation and communication with the processor 240, the image generator 203, the query engine 206, the symbolic representation module 208 and other components of the IBDM server 106.

In one embodiment, the table generator 204 receives the field images, label images and metadata from the image generator 203 or retrieves the field images, label images and metadata from data storage 250 for the purpose of generating a table. In one embodiment, the table generator 204 automatically generates a table by first designating a label image as a column header of the table. If other label images from the same form image are available, the other label images are designated as column headers as well. The table generator 204 then populates the column with field images that are associated with the label image according to the field identifier associated with each field image.

In one embodiment, the order of the field images under the column header is determined based on the form identifier associated with the field images. For example, a form identifier associated with a field image can indicate the time entry (time of fill-out) associated with the form image that is earlier than another field image in another form image and so the field images are arranged with the first field image appearing above the second field image.

The table generator 204 generates a table that comprises columns organized in different ways. In one embodiment, the label images are placed according to their location in the form image so that the first field in the form image appears before the second field, etc. This is referred to as a reading order. In another embodiment, the table generator 204 places columns that include field images containing unique numbers before other field images. For example, the table generator 204 places field images of social security numbers for the users of the portable computing devices 102 as the first column because it can be used to uniquely identify the user.

In one embodiment, the table generator 204 extracts metadata associated with the form images and incorporates the metadata into at least one additional column. For example, the table generator 204 extracts the date of when the form was filled out or a location where the form was filled out and adds two columns to the table. In one embodiment, the table generator 204 associates the original version of the form images with the table and instructs the user interface engine 210 to generate a pop-up with the original version of the form image in response to a user hovering over a field image in the table. In another embodiment, the pop-up is provided to the user in response to the user selecting a row in the table. Lastly, the table generator 204 generates a modified table in response to receiving a query from the query engine 206, which is discussed in greater detail below.

The query engine 206 is software and routines for generating queries to query the data storage 250 in response to receiving requests relating to the table from a user device 103 via the communication unit 255. In one embodiment, the query engine 206 is a set of instructions executable by the processor 240 to provide the functionality described below for generating queries. In another embodiment, the query engine 206 is stored in the memory 245 and is accessible and executable by the processor 240. In either embodiment, the query engine 206 is adapted for cooperation and communication with the processor 240, the communication unit 255, the table generator 204, the symbolic representation module 208 and other components of the IBDM server 106.

In one embodiment, the query engine 206 receives requests to modify the table from the user device 103 and generates queries in response to receiving the requests. The query engine 206 then queries the data storage 250 using the queries and the table generator 204 recreates the table accordingly with the results obtained from the data storage 250. The queries generated by the query engine 206 are based on symbolic information or stroke image information associated with the table. Those skilled in the art will recognize that any number of requests may be received for generating queries by the IBDM server 106. The following query processes are provided by way of example and not by way of limitation as processes that the IBDM server 106 may implement. Furthermore, each of the queries generated may be combined with others for increased functionality.

In one embodiment, the query engine 206 receives a request from the user device 103 via the controller 202 to filter the table by one or more columns of the table and generates a query in response to receiving the request. In one embodiment, the request is received to filter the table by selecting a field image under at least one column header of the table as being representative of how the table is to be filtered. For example, the user selects an image of a check box with strokes under a column associated with a "male" field label and requests that the table generator 204 filter the rows of the table and return the table only with the rows representing field images that contain strokes on check boxes associated with the "male" field. In another embodiment, the request is received to filter the table by selecting a field image with no strokes under the other column header of the table as being representative of how the table is to be filtered. For example, the user selects an image of a check box with no strokes under a column associated with a "widowed" label image and requests the table generator 204 to filter the rows of the table and return the table only with the rows representing field images that contain no strokes on check boxes associated with "widowed" label image. In yet another embodiment, the request is received to filter the table by selecting the field image of strokes under the at least one column header and the field image of no strokes under the at least one other column header as being representative of how the table is to be filtered. For example, the user selects the image of a check box with strokes under the column associated with "male" label image and selects the field image of a check box with no strokes under the column associated with "widowed" label image and requests that the table generator 204 filter the rows of the table and return the table only with rows including field images that contain strokes on check boxes associated with "male" label image and no strokes on check boxes associated with "widowed" label image.

In a second example, the query engine 206 receives a request to move at least one column in the table to a new location within the table. In one embodiment, in response to a user that viewed the user interface on the user device 103 dragging a column in the table to another position in the table, the query engine 206 translates the dragging motion into a query. The query is then forwarded to the table generator 204 to produce the modified table with the column moved into a new location within the table. For example, a user might want the reading order of the table from left to right to start with a column associated with a last name and then followed by a column associated with a first name and could request to switch the locations of each column within the table by dragging the columns to their intended locations.

In another embodiment, the query engine 206 receives a request to sort at least one row of the table by at least one column from the user device 103 via the controller 202. In one embodiment, the field images in the at least one column are converted to symbolic representations by the symbolic representation module 208. The query engine 206 then generates a query that accesses the metadata including symbolic information associated with the symbolic representations of content in the at least one column and forwards the metadata to the table generator 204 for the table generator 204 to sort the at least one row of the table by the at least one column. For example, the user may request to sort the table by the column "first name" in the table and return the table sorted either in ascending order, descending order or by a number of characters in the "first name" fields.

The symbolic representation module 208 is software and routines for generating symbolic representations for content in the field images or label images associated with the table. In one embodiment, the symbolic representation module 208 is a set of instructions executable by the processor 240 to provide the functionality described below for generating symbolic representation. In another embodiment, the symbolic representation module 208 is stored in the memory 245 and is accessible and executable by the processor 240. In either embodiment, the symbolic representation module 208 is adapted for cooperation and communication with the processor 240, the communication unit 255, the table generator 204, the query engine 206 and other components of the IBDM server 106.

In one embodiment, the symbolic representation module 208 receives the field images and/or the field labels from the table generator 204. The symbolic representation module 208 generates symbolic information (for example, machine encoded text such as American Standard Code for Information Exchange (ASCII)) for the field or label image using, for example, Optical Character Recognition (OCR), Optical Mark Recognition (OMR), handwriting recognition, pattern recognition, interaction with a Human-in-the-loop (HITL) system, etc. In one embodiment, the symbolic representation module 208 generates a new image that represents the field or label image after conversion to symbolic representations and associates the symbolic information as metadata to the new image. The symbolic representation module 208 then transmits the new image to the table generator 204.

In one embodiment, the symbolic representation module 208 receives a request via the controller 202 to convert a cropped image of a label image (used as the column header) and at least one field image associated with the column header in the table to symbolic representations. In one embodiment, the at least one image including the symbolic representations may not always be accurate and the user interacting with the table may wish to change and/or add to the field or label image including the symbolic representations in the table. In response to any user edits, the user interface engine 210 updates the table and data storage 250 with the edited information.

In another embodiment, the symbolic representation module 208 is connected to a human-in-the-loop (HITL) system and the symbolic conversion is performed by providing the field or label image to a human user accessing the user device 103 over the network 104 and allowing the human user to select the image including the preferred symbolic representation. The human selected representation is returned to the symbolic representation module 208 which then transmits the new representation accordingly to the table generator 204 and data storage 250. For example, the user interacting with the table might want to convert the column "First Name" and field images of handwriting strokes associated with the column "First Name" and can request conversion by connecting to a human-in-the-loop (HITL) system like Amazon's Mechanical Turk system. This makes it easier for the user to request a conversion of just a portion of data (a single column representing data from the same field on all of the form images) in the table instead of the table as a whole, thereby using computing resources efficiently and saving time.

The user interface engine 210 is software including routines for generating graphical data for displaying a user interface that includes a table and an overview of all the query engine 206 features. In one embodiment, the user interface engine 210 is a set of instructions executable by the processor 240 to generate the user interface. In another embodiment, the user interface engine 210 is stored in the memory 245 and is accessible and executable by the processor 240. In either embodiment, the user interface engine 210 is adapted for cooperation and communication with the processor 240 and other components of the IBDM server 106.

In one embodiment, responsive to a user of a user device 103 requesting the user interface, the user interface engine 210 retrieves the table from the table generator 204 or from data storage 250 and generates graphical data for displaying the table. In one embodiment, the table is further modified according to user requests received from the user device 103 via the controller 202. For example, the user interface engine 210 receives the instructions via the user device 103 associated with moving columns, sorting rows and re-sizing column width. The user interface engine 210 arranges the rows to include field images from the form image and columns to represent the field images from multiple forms that are associated with a single label image.

The user interface engine 210 receives a request to re-size at least a width of one or more columns of the table from a user device 103 via the controller 202. As described above, the user interface engine 210 saves metadata that is associated with the table to recreate the table with the specified dimensions for the user in the future.

In another embodiment, the user interface engine 210 receives a request to edit labels on the original form via the controller 202. The user interface engine 210 generates graphical data for the original form and transmits the form to the user device 103 via the communication unit 255. The user interface engine 210 then receives the edits from the user via the controller 202 and modifies the original form, which is then saved to the data storage 250. For example, the user requests that the label image "SSN" be converted to "Social Security Number" for better understanding. The user interface engine 210 updates the text in the form and generates a new form image that includes the updated label. In another embodiment, the user interface engine 210 also receives edits from the user of a user device 103 via the controller 202 of symbolic representations that had been converted by the symbolic representation module 208 from a label or field image. The user interface engine 210 updates the information for generating the table to incorporate the user's edits. Graphical representations of these examples are described in greater detail below.

Creating and Modifying Table

FIG. 3 is an example of a graphic representation of a user interface 300 displayed on a user device 103 that is generated by the user interface engine 210. In this example, the user interface 300 includes a table 302 that is generated from a plurality of form images received by the Image Based Document Management (IBDM) server 106. In this example, the table 302 is accessible via a website associated with the Image Based Document Management (IBDM) server 106 to let a user review the plurality of form images in a tabular form. The table 302 includes field images from the same form image in a row 304 and field images from form images that are associated with the same label as a column 306. Label images from the form image are used as column headers, such as the first name column header 308 in the table 302. In addition, the table 302 also includes metadata associated with the form images as one of the columns. For example, secondary information such as a location 312 where a form was filled out can be attached to the form image as metadata and represented in the table 302 as a column. This information is represented symbolically because the table generator 204 extracted the information from the metadata and not information input by a user of the portable computing device 102 using the stylus.

Figure 4:
FIG. 4 is a graphic representation of an example pop-up of a form image that is displayed in response to a user selecting a form image in the table associated with form image.

FIG. 4 is an example of a graphic representation of a user interface 400 that is generated responsive to the user selecting a row 304 in the table 302 on the user device 103. In this example, the user interface 400 includes a pop-up 314 of an original version of a form image represented by the row 304. In another embodiment, the pop-up 314 can appear in response to hovering over any field image 316 associated with the form image.

FIG. 5 is an example of a graphic representation of a user interface 500 that is generated responsive to the user opting to filter the table 302 by the presence of strokes in the column 502. In this example, the user interface 500 includes a drop down menu 504 associated with the column 502 to receive a selection. The column 502 associated with column header "male" includes strokes 508 on certain entries. The user can opt to filter the table 302 by the column 502 by selecting the strokes tab 506 in the drop down menu 504 as being representative of the filtering the user desires in the table 302. By executing this filter request, only those rows containing strokes on the field "male" are returned in the modified table.

Figure 6:
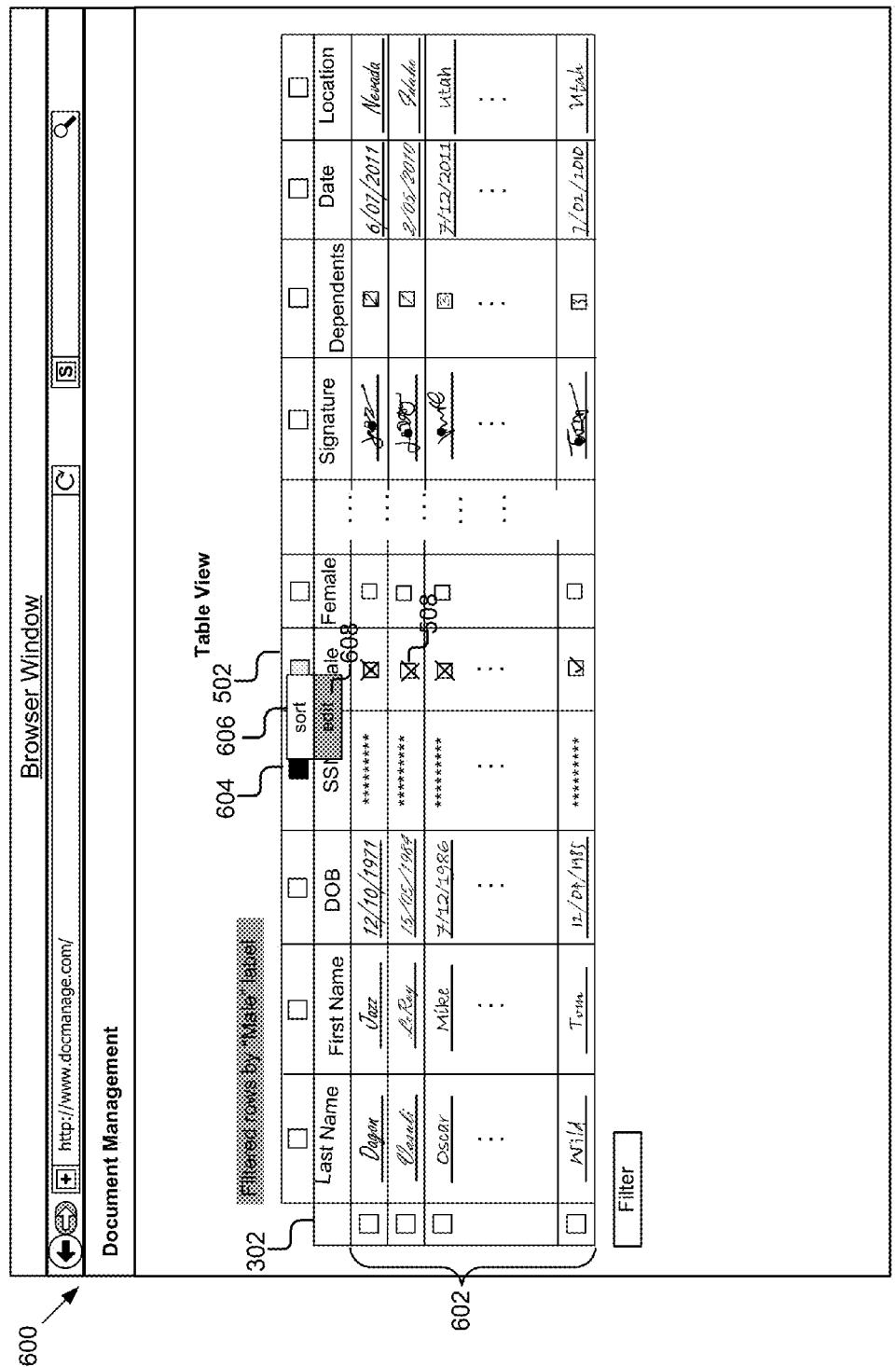
FIG. 6 is a graphic representation of an example table that includes an option for editing a column header in the table.

FIG. 6 is an example of a graphic representation of a user interface 600 that is generated responsive to the request placed in FIG. 5. In this example, the user interface 600 includes the table 302 that is refreshed to include only the set 602 of rows that have strokes 508 under the column header "male" associated with the column 502. In addition, the user interface 600 includes the user opting to edit the column header "SSN" associated with the column 604. Selecting the column 604 causes the user interface 600 to display a drop down menu 606. In the drop down menu 606, the user selects to edit the column header "SSN" by clicking on the edit tab 608.

Figure 7:
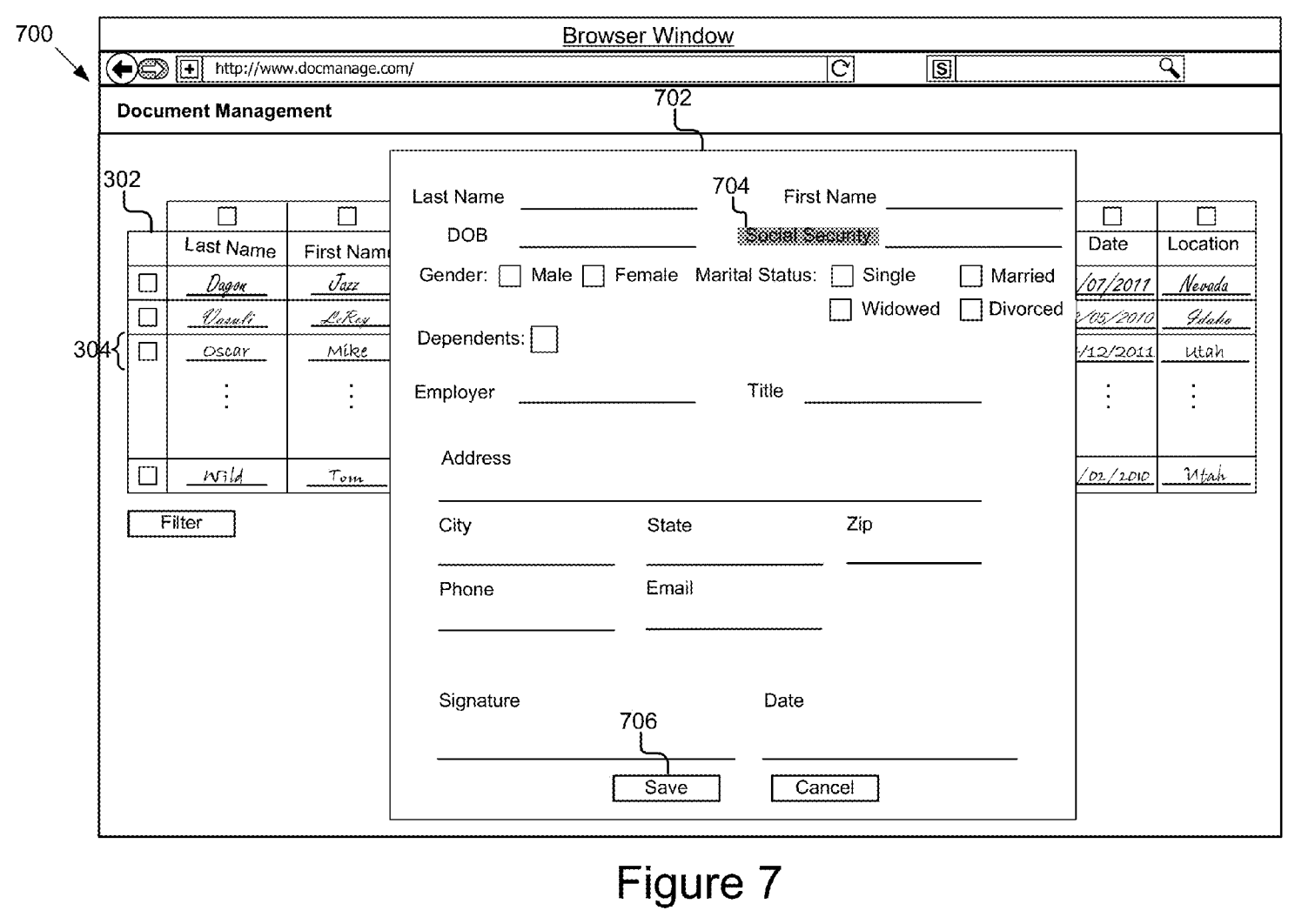

FIG. 7 is an example of a graphic representation of a user interface 700 that is generated responsive to the request to edit the column header "SSN" placed in FIG. 6. In this example, the user interface 700 includes a pop-up 702 of an original version of the un-filled form common in layout to all the plurality of forms used to build the table 302. The user selects the field 704 in the pop-up 702 associated with the column header "SSN" and types in a desired title. The user saves the edit to the field 704 by clicking on the save button 706 in the pop-up 702. The user interface engine 210 then saves the edits to the form and to the column header for the table in data storage 250.

FIG. 8 is another example of a graphic representation of a user interface 800 generated by the user interface engine 210. In this example, the user selects a column 802 associated with "First Name" field label to convert the image representation of the strokes of the column 802 to symbolic representations. Selecting the column 802 causes the user interface 800 to display a drop down menu 804. In the drop down menu 804, the user selects the convert tab 806 and then selects the symbolic tab 808.

Figure 9:
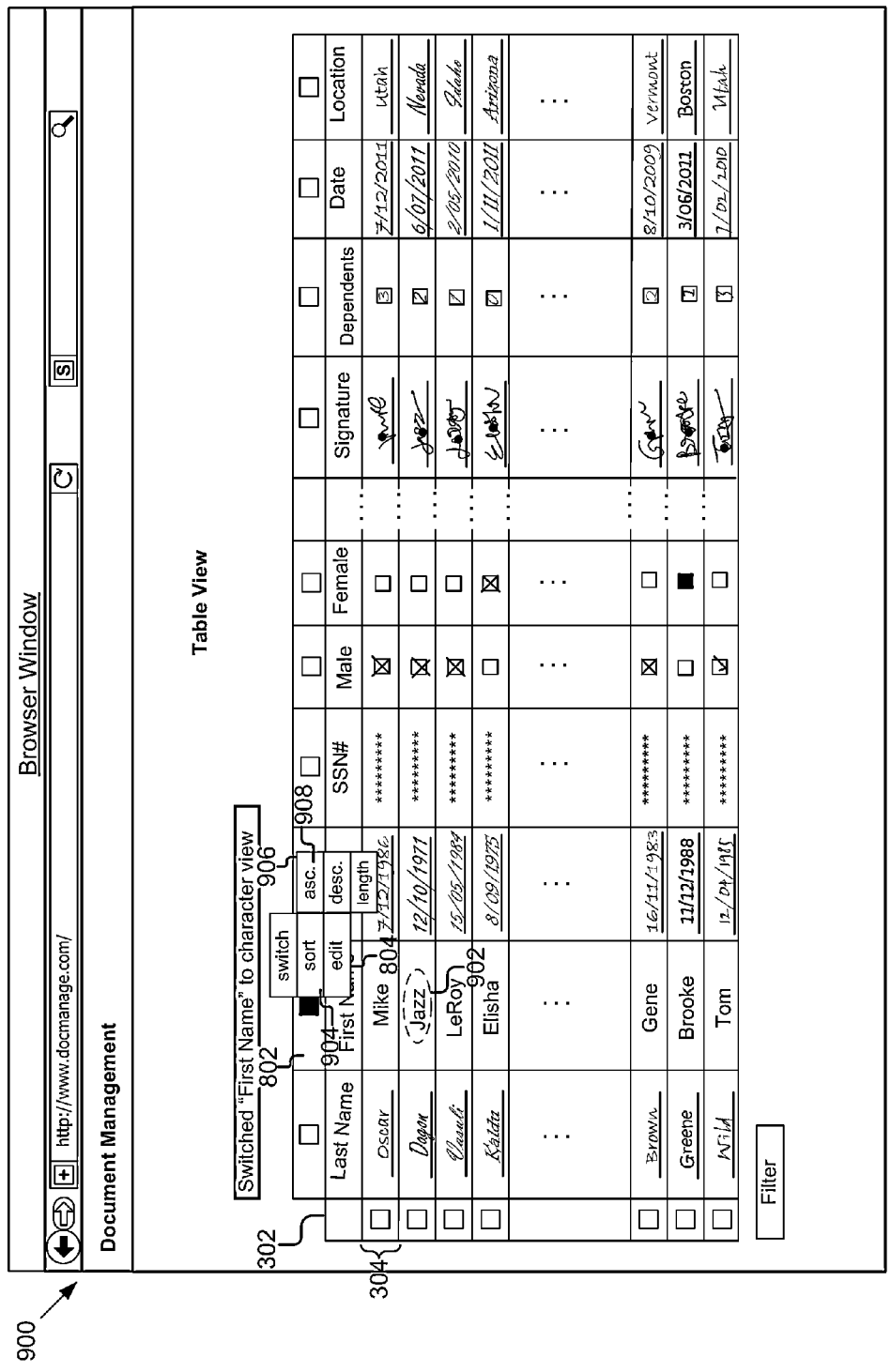
FIG. 9 is a graphic representation of an example table that includes an option for sorting the table by the content in a column.

FIG. 9 is an example of a graphic representation of a user interface 900 that is generated responsive to the request placed in FIG. 8 for switching a column to symbolic representations. In this example, the user interface 900 replaces the image representation of strokes of column 802 with their respective symbolic representations 902. In addition, the user interface 900 includes the user opting to sort the table 302 by the symbolic representations 902 of the content in column 802. Selecting the column 802 causes the user interface 900 to display the drop down menu 804. In the drop down menu 804, selecting the sort tab 904 causes the user interface 900 to display a second drop down menu 906. In the second drop down menu 906, the user selects to sort the table 302 in ascending order by selecting the "asc." tab 908.

Figure 10:
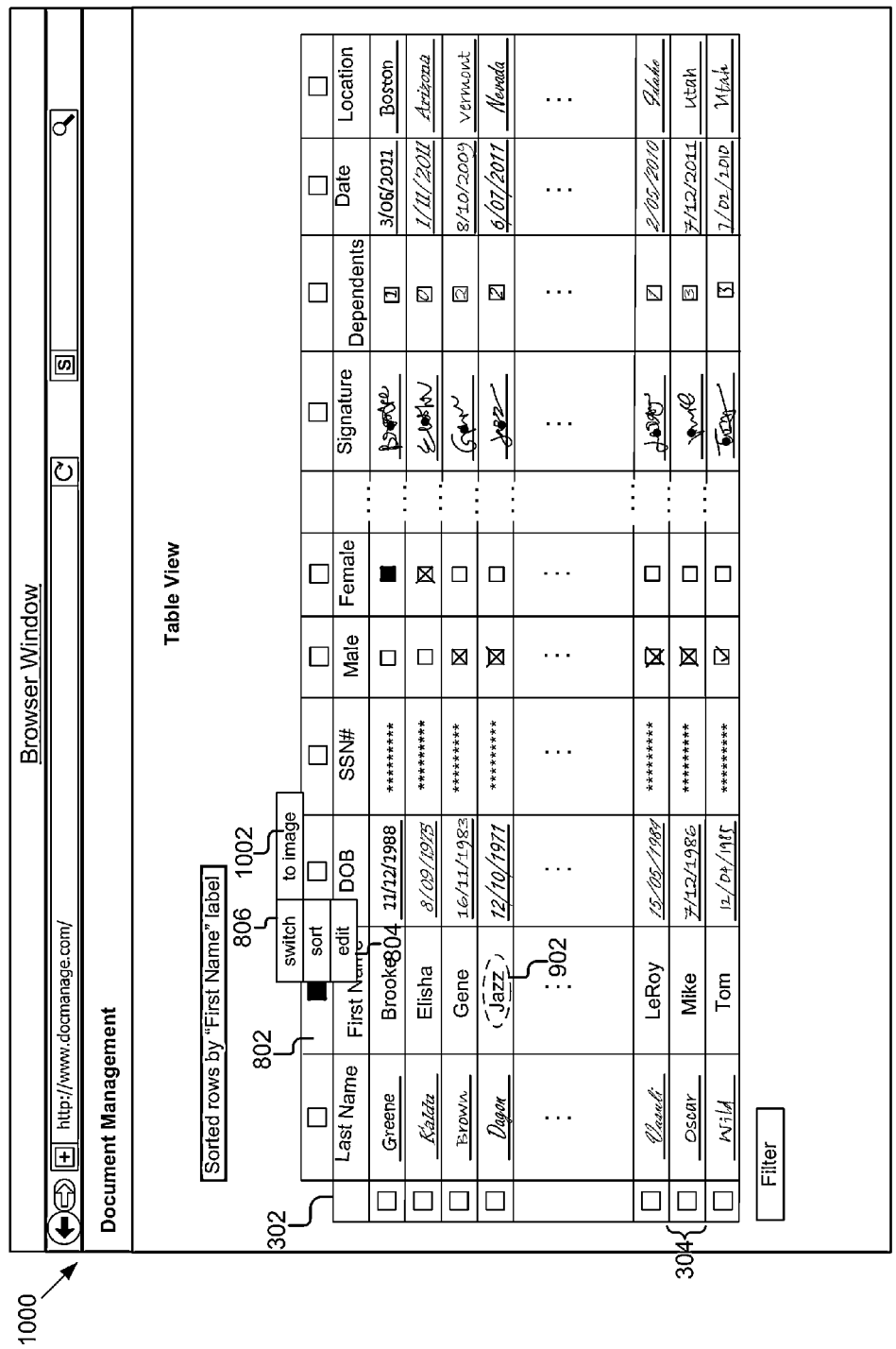
FIG. 10 is a graphic representation of an example table that includes an option for switching from a view of the symbolic representations in a column back to image representation in the table.

FIG. 10 is an example of a graphic representation of a user interface 1000 that is generated responsive to the request to sort the table 302 placed in FIG. 9. In this example, the user interface 1000 refreshes the table 302 to display the rows sorted by the symbolic representations of the strokes of column 802. For instance, the row 304 is moved to one position before the last in the table from an initial position as represented in FIG. 9 due to sorting. In addition, the user interface 1000 also includes the user opting to switch the symbolic representations of the strokes of column 802 back to field images. Selecting the column 802 causes the user interface 1000 to display the drop down menu 804. In the drop down menu 804, the user selects the switch tab 806 and then selects image tab 1002.

Figure 11:
FIG. 11 is a graphic representation of an example table that includes an option for filtering the table with multiple sets of queries.

FIG. 11 is an example of a graphic representation of a user interface 1100 that is generated responsive to the request placed in FIG. 10 for switching the column 802 back to field images. In this example, the user interface 1100 refreshes the table 302 and switches the contents of column 802 back to field images. For instance, the symbolic representations 902 from FIG. 10 are converted back to field images 1102. In addition, the user interface 1100 also includes the user opting to filter the rows of the table with multiple sets of queries. In this example, selecting the filter button 1104 causes the user interface 1100 to display a scroll down menu 1106. The scroll down menu 1106 includes the names of column headers that allow strokes as entries in the table next to a check box. The user checks the male column header 1108 and the single column header 1110 and then selects the filter button 1104 indicating the user interface 1100 to return the table 302 only with those rows that include strokes under the male column header 1108 and the single column header 1110.

Figure 12:
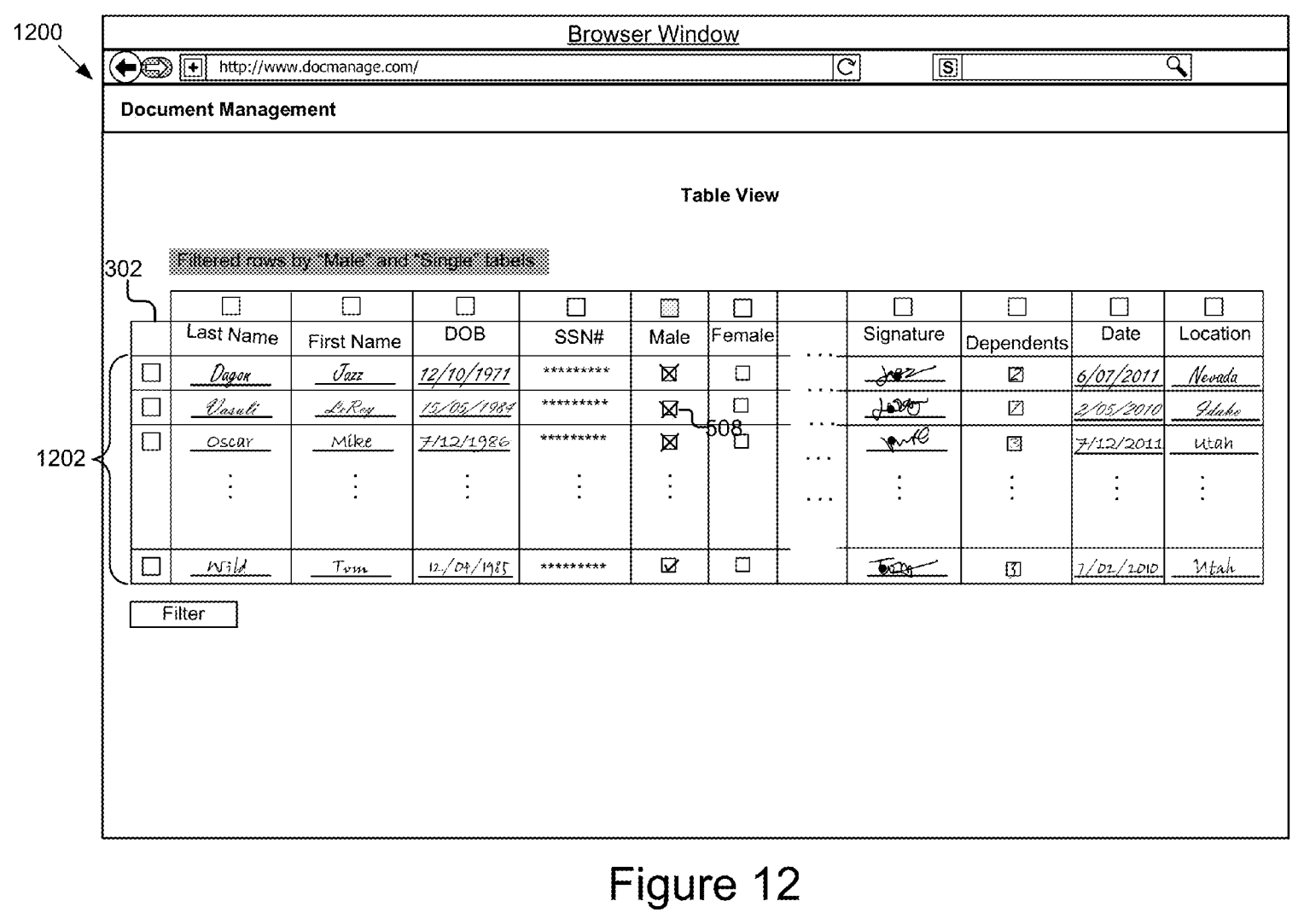

FIG. 12 is an example of a graphic representation of a user interface 1200 that is generated responsive to the multiple filter request placed in FIG. 11. In this example, the user interface 1200 includes the table 302 that is refreshed to include only the set 1202 of rows that have strokes 508 under the column headers selected in the filter request.

Methods

Figure 13:
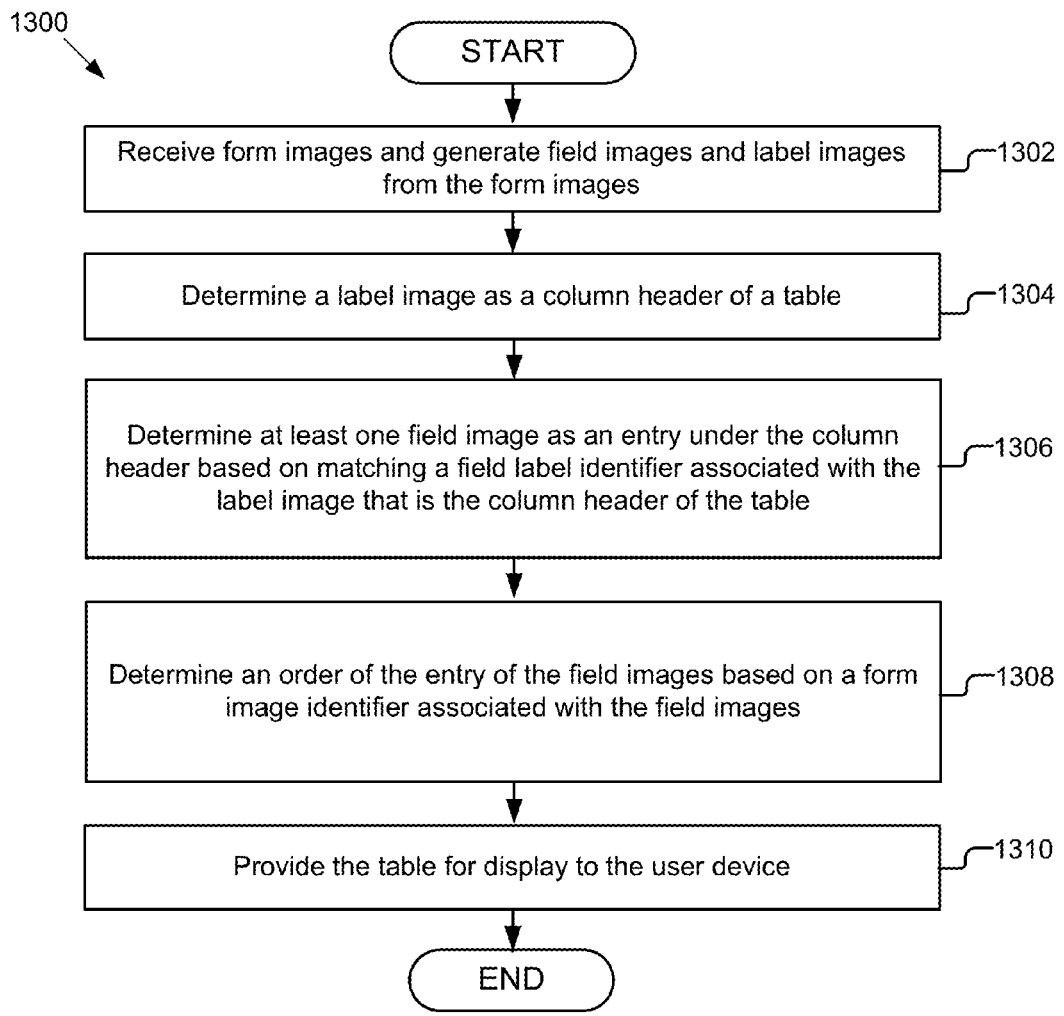
FIG. 13 is a flow diagram of one embodiment of a method for generating a table.
Figure 14:
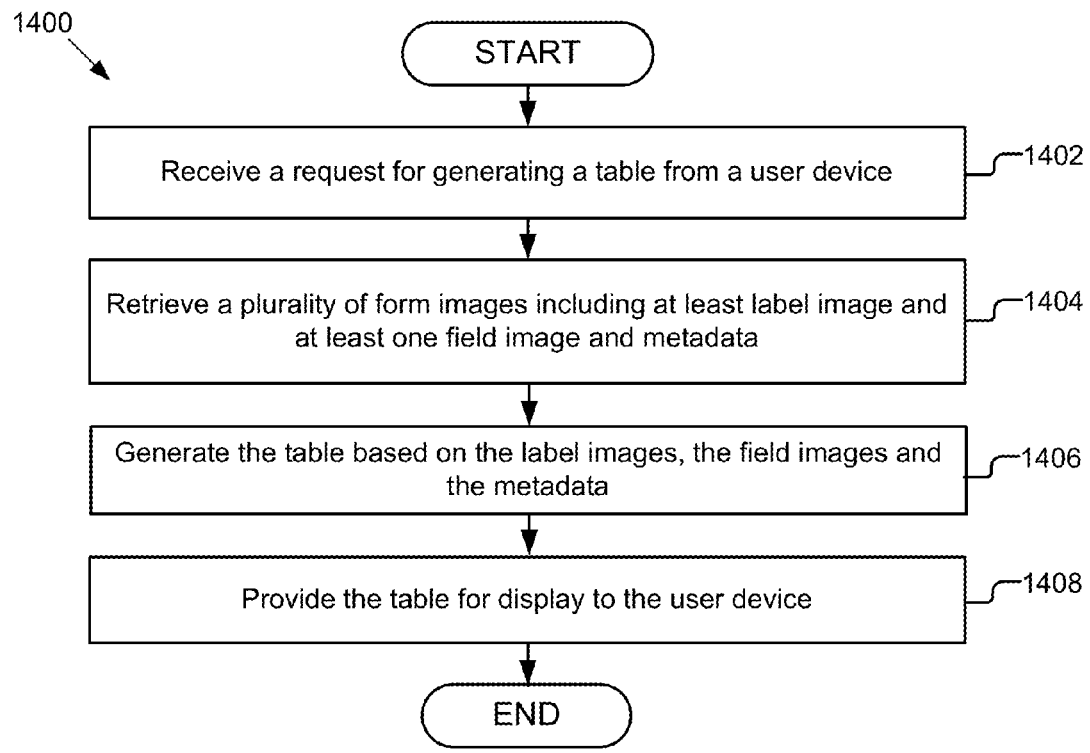
FIG. 14 is a flow diagram of another embodiment of a method for generating a table.
Figure 15:
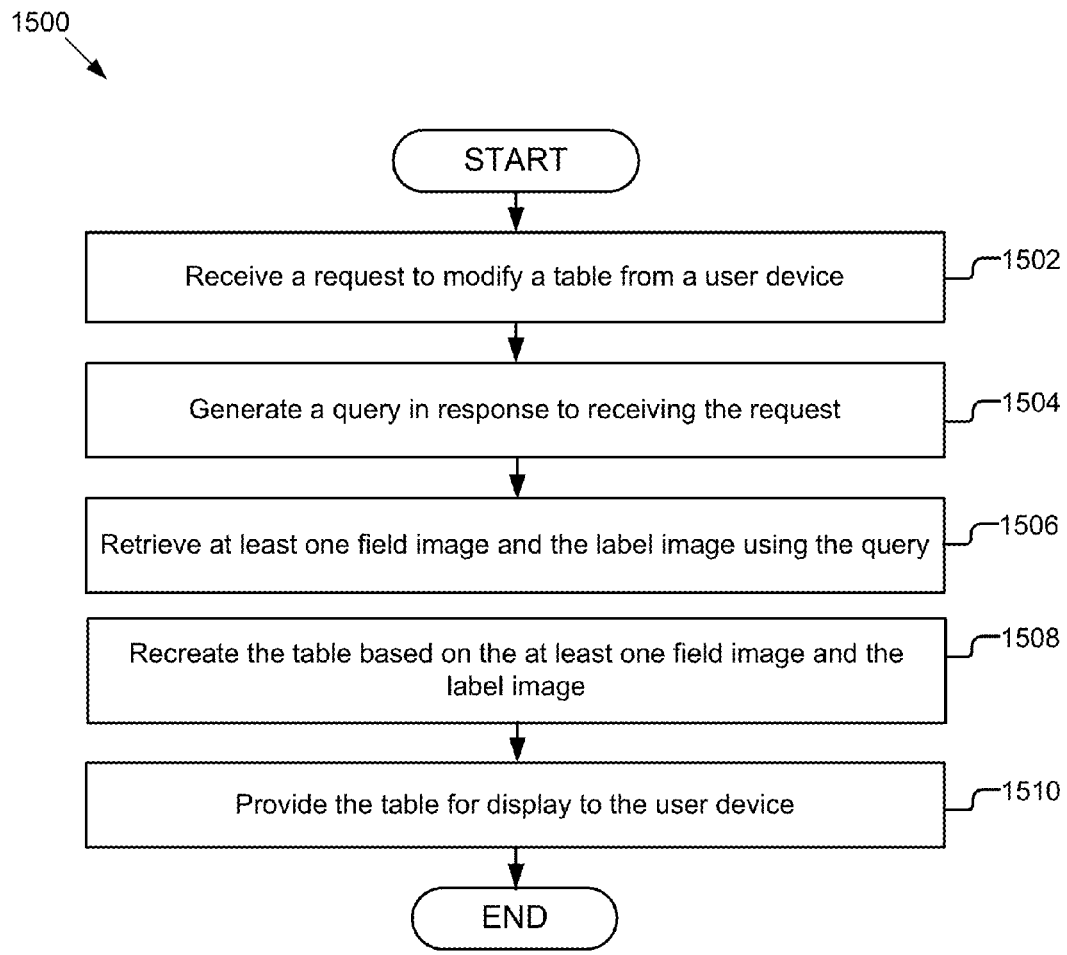
FIG. 15 is a flow diagram of one embodiment of a method for modifying a table.

Referring now to FIGS. 13-15, the methods of the present embodiment of invention will be described in more detail. FIG. 13 is a flow diagram 1300 that illustrates one embodiment of a method for generating a table. The IBDM server 106 includes an image generator 203 and a table generator 204. The image generator 203 receives 1302 a plurality of form images from the portable computing devices 102 and generates field images and label images from the form images. In one embodiment, the image generator 203 generates the form images by saving stroke metadata from all the strokes on each form that intersected a field bounding box and stores the stroke metadata in the data storage 250. In another embodiment, the image generator 203 crops the field images directly from the form images and indexes the field images.

These steps are discussed in greater detail above with reference to the image generator 203.

The table generator 204 determines 1304 a label image as a column header of a table. The table generator 204 determines 1306 at least one field image as an entry under the column header based on matching a field identifier associated with the label image that is the column header of the table. The table generator 204 then determines 1308 an order of the entry of the field images based on a form identifier associated with the field images. For example, the column could be populated with form images based on the time when a user of the portable computing device 102 filled out the form. The IBDM server 106 also includes a user interface engine 210 that generates graphical data for providing 1310 the table for display to the user device 103.

FIG. 14 is a flow diagram 1400 that illustrates another embodiment of a method for generating a table. The IBDM server 106 includes a table generator 204 and a user interface engine 210. The table generator 204 receives 1402 a request for generating a table from a user device 103 via the controller 202. In response to receiving the request, the table generator 204 retrieves 1404 a plurality of form images including at least one label image and at least field image and the metadata. The table generator 204 then generates 1406 the table based on the label images, the field images and metadata. The user interface engine 210 then generates graphical data for providing 1408 the table for display to the user device 103. In one embodiment, the table is generated in reading order of any one form image since the layout of the form image is common across the plurality of form images. The reading order is determined based on the metadata, which includes a timestamp for when users entered stroke information into each field. In another embodiment, the table comprises at least one row of the table representing a form image from the plurality of form images and with at least one column of the table representing at least one field image associated with the at least one column from the plurality of form images.

FIG. 15 is a flow diagram 1500 that illustrates one embodiment of a method for modifying the table. The IBDM server includes a query engine 206 and a table generator 204. The query engine 206 receives 1502 a request to modify the table from a user device 103 via the controller 202. Responsive to receiving the request, the query engine 206 generates 1504 a query and then retrieves 1506 field and label images from data storage 250 using the query. The request can be used to sort the table, filter the table, switch to symbolic representation, change the field name, etc. The table generator 204 recreates 1508 the table and instructs the user interface engine 210 to generate graphical data for providing 1510 the table accordingly for display to the user device 103.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for generating a table, the method comprising:
   receiving a request for generating the table from a user device;
   retrieving a plurality of form images, each one of the plurality of form images comprising at least one field and a label;
   generating at least one field image by cropping handwriting strokes associated with the at least one field from each one of the plurality of form images, wherein the at least one field image includes the cropped handwriting strokes;
   generating a label image by analyzing an area around the at least one field image to identify a group of pixels and cropping the group of pixels from one of the plurality of form images, wherein the label image includes the cropped group of pixels;
   generating, with one or more processors, the table based on the at least one field image and the label image, the label image representing a column header for a column that includes the at least one field image; and
   providing the table for display to the user device.

2. The computer-implemented method of claim 1, wherein the plurality of form images share a common form layout and each of the plurality of form images represent a different set of information.

3. The computer-implemented method of claim 1, wherein each field image is associated with metadata for specifying the label image associated with each field image.

4. The computer-implemented method of claim 1, wherein generating the table further comprises:
   determining the at least one field image as an entry under the column header based on matching a field identifier associated with each of the at least one field image; and
   determining an order of entry for each of the at least one field image under the column header based on a form identifier associated with each of the at least one field image.

5. The computer-implemented method of claim 1, wherein providing the table comprises displaying at least one of the plurality of form images as at least one row in the table.

6. The computer-implemented method of claim 1, wherein providing the table comprises displaying a pop-up of an original version of a form image to a user in response to hovering over the at least one field image associated with the original version of a form image in the table.

7. The computer-implemented method of claim 1 further comprising:
   receiving a request to modify the table from the user device;
   generating a query in response to receiving the request;

retrieving the at least one field image and the label image using the query;

recreating the table based on the at least one field image and the label image; and providing the table for display to the user device.

8. The computer-implemented method of claim 7, wherein recreating the table comprises filtering the table including at least one row by selecting the at least one field image as being representative of the filtering.

9. The computer-implemented method of claim 7, wherein recreating the table comprises converting the column to symbolic representations and graphically changing at least one character in the symbolic representation.

10. The computer-implemented method of claim 9, further comprising sorting at least one row of the table by the symbolic representations under the column header.

11. The computer-implemented method of claim 7, wherein recreating the table comprises moving at least one column of the table to a new location within the table.

12. The computer-implemented method of claim 7, wherein recreating the table comprises re-sizing a width of the column in the table.

13. A system for generating a table, the system comprising:
a processor;
a table generator stored on a memory and executable by the processor, the table generator for receiving a request for generating the table from a user device, retrieving a plurality of form images, each one of the plurality of form images comprising at least one field and a label, generating at least one field image by cropping handwriting strokes associated with the at least one field from each one of the plurality of form images, wherein the at least one field image includes the cropped handwriting strokes, generating a label image by analyzing an area around the at least one field image to identify a group of pixels and cropping the group of pixels from one of the plurality of form images, wherein the label image includes the cropped group of pixels and generating the table based on the at least one field image and the label image, the label image representing a column header for a column that includes the at least one field image; and
a user interface engine for providing the table for display to the user device.

14. The system of claim 13, wherein the table generator generates the table by determining the at least one field image as an entry under the column header based on matching a field identifier associated with each of the at least one field image and determining an order of entry for each of the at least one field image under the column header based on a form identifier associated with each of the at least one field image.

15. The system of claim 13, further comprising:
a query engine that is coupled to the table generator, the query engine for receiving a request to modify the table from the user device, generating a query in response to receiving the request and retrieving the at least one field image and the label image using the query,
wherein the table generator recreates the table based on the at least one field image and the label image and the user interface engine provides the table for display to the user device.

16. The system of claim 15, wherein recreating the table comprises filtering the table including at least one row by selecting the at least one field image as being representative of the filtering.

17. A computer program product embodied on a non-transitory computer readable medium, wherein the computer readable product when executed on a computer causes the computer to:
receive a request for generating the table from a user device;
retrieve a plurality of form images, each one of the plurality of form images comprising at least one field and a label;
generate at least one field image by cropping handwriting strokes associated with the at least one field from each one of the plurality of form images, wherein the at least one field image includes the cropped handwriting strokes;
generate a label image by analyzing an area around the at least one field image to identify a group of pixels and cropping the group of pixels from one of the plurality of form images, wherein the label image includes the cropped group of pixels;
generate the table based on the at least one field image and the label image, the label image representing a column hearer for a column that includes the at least one field image; and
provide the table for display to the user device.

18. The computer program product of claim 17 further comprises:
receive a request to modify the table from the user device;
generate a query in response to receiving the request;
retrieve the at least one field image and the label image using the query;
recreate the table based on the at least one field image and the label image; and
provide the table for display to the user device.

19. The computer program product of claim 18, further comprising converting the column to symbolic representations and graphically changing at least one character in the symbolic representation.

20. The computer program product of claim 19, further comprising sorting at least one row of the table by the symbolic representations under the column header.

* * * * *